(12) United States Patent
Chand et al.

(10) Patent No.: US 12,534,362 B2
(45) Date of Patent: Jan. 27, 2026

(54) MICRO-ELECTRO-MECHANICAL SYSTEM (MEMS) DEVICES INCLUDING SIDEWALL STOPPERS

(71) Applicant: Vanguard International Semiconductor Corporation, Hsinchu (TW)

(72) Inventors: Rakesh Chand, Singapore (SG); Sock Kuan Soo, Singapore (SG); Muniandy Shunmugam, Singapore (SG); Ramachandramurthy Pradeep Yelehanka, Singapore (SG)

(73) Assignee: Vanguard International Semiconductor Corporation, Hsinchu (TW)

( * ) Notice: Subject to any disclaimer, the term of this patent is extended or adjusted under 35 U.S.C. 154(b) by 803 days.

(21) Appl. No.: 17/697,957

(22) Filed: Mar. 18, 2022

(65) Prior Publication Data
US 2023/0294980 A1    Sep. 21, 2023

(51) Int. Cl.
*B81C 1/00* (2006.01)
*B81B 3/00* (2006.01)
*H10N 30/30* (2023.01)

(52) U.S. Cl.
CPC ........ *B81C 1/00571* (2013.01); *B81B 3/0021* (2013.01); *B81B 2201/0235* (2013.01); *B81B 2201/0242* (2013.01); *B81B 2203/0315* (2013.01); *B81C 2201/0104* (2013.01); *B81C 2201/014* (2013.01);
(Continued)

(58) Field of Classification Search
CPC .......... B81B 3/0021; B81B 2201/0235; B81B 2201/0242; B81B 2201/0264; B81B 2203/0315; B81B 2203/0118; B81B 3/0127; H10N 30/302; H10N 30/308; H10N 30/306
See application file for complete search history.

(56) References Cited

U.S. PATENT DOCUMENTS

| 6,388,300 | B1 * | 5/2002 | Kano | ................. | B81B 3/0086 |
| | | | | | 257/419 |
| 7,083,997 | B2 * | 8/2006 | Brosnihhan | ......... | B81C 1/00246 |
| | | | | | 438/455 |

(Continued)

FOREIGN PATENT DOCUMENTS

| CN | 103407958 | 11/2013 |
| CN | 105405867 B | 7/2019 |

(Continued)

OTHER PUBLICATIONS

Qian, the specification, including the claims, and drawings in the U.S. Appl. No. 16/993,274, filed Aug. 14, 2020.

*Primary Examiner* — Ida M Soward
(74) *Attorney, Agent, or Firm* — Winston Hsu

(57) ABSTRACT

A micro-electro-mechanical system (MEMS) device includes a supporting substrate, a cavity disposed in the supporting substrate, a stopper, and a MEMS structure. The stopper is disposed between the supporting substrate and the cavity, and an inner sidewall of the stopper is in contact with the cavity. The stopper includes a filling material surrounding a periphery of the cavity, and a liner wrapping around the filling material. The MEMS structure is disposed over the cavity and attached on the stopper and the supporting substrate.

9 Claims, 9 Drawing Sheets

(52) U.S. Cl.
CPC ............... *B81C 2201/0176* (2013.01); *B81C 2201/0181* (2013.01); *B81C 2201/0197* (2013.01); *H10N 30/302* (2023.02); *H10N 30/306* (2023.02); *H10N 30/308* (2023.02)

(56) References Cited

U.S. PATENT DOCUMENTS

| | | | | |
|---|---|---|---|---|
| 7,923,790 | B1* | 4/2011 | Quevy | B81C 1/00293 257/415 |
| 7,956,302 | B1* | 6/2011 | Jean | G01P 1/023 200/61.45 R |
| 8,518,732 | B2* | 8/2013 | Kautzsch | B81B 3/0021 438/700 |
| 9,090,452 | B2* | 7/2015 | Cheng | B81B 3/001 |
| 9,309,109 | B2* | 4/2016 | Chu | B81C 1/00238 |
| 9,425,328 | B2* | 8/2016 | Marx | G01P 15/125 |
| 2002/0117728 | A1* | 8/2002 | Brosnihhan | B81C 1/00142 257/446 |
| 2007/0281381 | A1 | 12/2007 | Ayazi | |
| 2009/0243004 | A1* | 10/2009 | Lan | B81C 1/00246 257/415 |
| 2012/0161254 | A1* | 6/2012 | Kautzsch | G01L 19/0636 257/415 |
| 2013/0270657 | A1* | 10/2013 | Acar | G01C 19/5755 438/53 |
| 2014/0239353 | A1* | 8/2014 | Daneman | B81C 1/00246 438/51 |
| 2015/0004732 | A1* | 1/2015 | Lan | B81C 1/00801 438/50 |
| 2016/0185592 | A1* | 6/2016 | Hsieh | B81B 3/0005 118/723 R |
| 2017/0096328 | A1* | 4/2017 | Tseng | B81C 1/00992 |
| 2018/0148327 | A1* | 5/2018 | Chang | B81C 1/00269 |
| 2022/0380209 | A1* | 12/2022 | Uddin | B81B 7/02 |

FOREIGN PATENT DOCUMENTS

| | | |
|---|---|---|
| TW | 201925077 A | 7/2019 |
| TW | 202002284 A | 1/2020 |
| TW | 202101546 A | 1/2021 |
| TW | 202117819 A | 5/2021 |
| WO | 2021/218219 A1 | 11/2021 |

\* cited by examiner

MICRO-ELECTRO-MECHANICAL SYSTEM (MEMS) DEVICES INCLUDING SIDEWALL STOPPERS

BACKGROUND OF THE INVENTION

1. Field of the Invention

The present disclosure relates generally to micro-electro-mechanical system (MEMS) devices, and more particularly to MEMS devices including a cavity and fabrication methods thereof.

2. Description of the Prior Art

Recently, micro-electro-mechanical systems (MEMS) devices are an enabling technology and have gained increased attention from multiple industries. A MEMS device may include a movable part and at least one other element, such as a pressure sensor, an actuator, or a resonator that is formed using a micromachining process that selectively etches away parts of a wafer. The wafer may include added structural layers and may be made of a semiconductor material such as silicon.

For most MEMS devices, a membrane consisting of elastic material, electrodes and piezoelectric material is disposed over a cavity to release the device and improve performance of the MEMS devices. Generally, the cavity underneath the membrane may be formed by using a cavity wafer bonded with a silicon-on-insulator (SOI) wafer, etching the backside of the wafer, or etching away a sacrificial material buried in the wafer. However, the dimensions of the cavity such as the depth, the width, and the diameter are difficult to be controlled by the conventional methods of forming the cavity. For example, it is difficult to form a deep cavity with precise size by the conventional methods. Besides, SOI wafers are costly, and the manufacturing processes for an SOI wafer bonded with a cavity wafer are time-consuming. Thus, there is a need of improved MEMS devices and fabrication methods thereof to overcome the aforementioned problems.

SUMMARY OF THE INVENTION

In view of this, embodiments of the present disclosure provide improved MEMS devices with precise control of the dimensions of a cavity and fabrication methods thereof in order to improve the performances of the MEMS devices, to enhance production yield, to increase product flexibility, and to save cycle time and cost of fabricating the MEMS devices.

According to one embodiment of the present disclosure, a micro-electro-mechanical system (MEMS) device is provided and includes a supporting substrate, a cavity disposed in the supporting substrate, a stopper, and a MEMS structure. The stopper is disposed between the supporting substrate and the cavity, and an inner sidewall of the stopper is in contact with the cavity, where the stopper includes a filling material surrounding a periphery of the cavity, and a liner wrapping around the filling material. The MEMS structure is disposed over the cavity and attached on the stopper and the supporting substrate.

According to one embodiment of the present disclosure, a method of fabricating a MEMS device is provided and includes the following steps. A supporting substrate is provided and etched to form a trench. The trench can be of any shape, such as a circle, ring, square, ellipse, polygon and so forth when viewed from top-down perspective. A liner is formed in the trench, and the trench is filled up with a filling material to form a stopper, where the stopper includes the liner and the filling material. A MEMS structure is formed on the stopper and the supporting substrate, where the MEMS structure includes a through hole. In addition, a portion of the supporting substrate is etched to form a cavity by providing an etchant through the through hole, where the stopper is in contact with the cavity.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Aspects of the present disclosure are best understood from the following detailed description when read with the accompanying figures. It is noted that, in accordance with the standard practice in the industry, various features may not be drawn to scale. In fact, the dimensions of the various features may be arbitrarily increased or reduced for clarity of discussion.

DETAILED DESCRIPTION

Figure 1A:
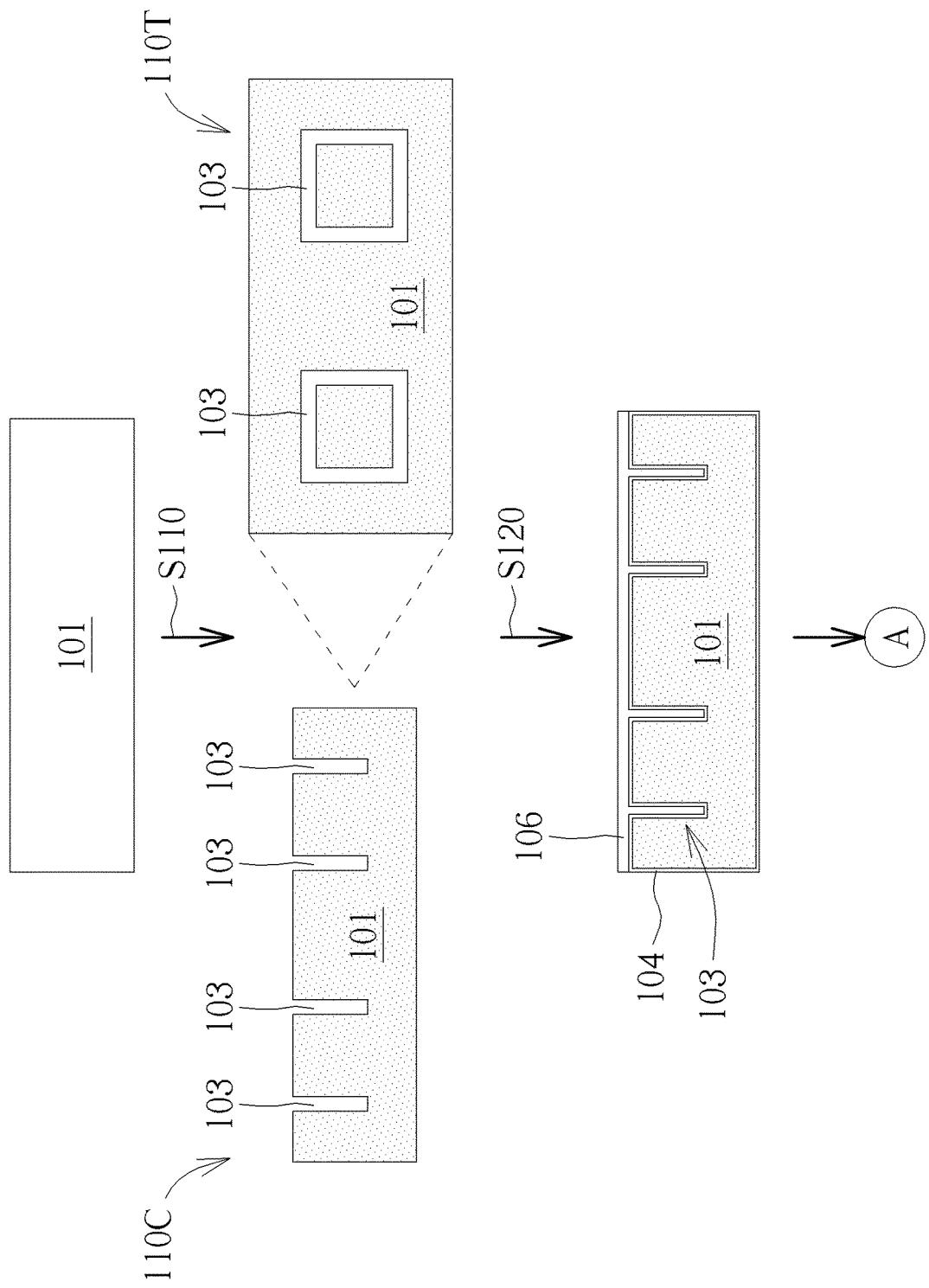
FIG. 1A to FIG. 1B shows schematic cross-sectional diagrams and some top views of several stages of a method of fabricating a MEMS device according to one embodiment of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath", "below", "lower", "under", "on", "over", "above", "upper", "bottom", "top" and the like, may be used herein for ease of description to describe one element or feature's relationship to another element (s) or feature (s) as illustrated in the figures. The spatially relative terms are intended to encompass different orientations of the device in use or operation in addition to the orientation depicted in the figures. For example, if the device in the figures is turned over, elements described as "below" and/or "under" other elements or features would then be oriented "above" and/or "over" the other elements or features. The apparatus may be otherwise oriented (rotated 90 degrees or at other orientations) and the spatially relative descriptors used herein may likewise be interpreted accordingly.

It is understood that, although the terms first, second, third, etc. may be used herein to describe various elements, components, regions, layers and/or sections, these elements, components, regions, layers and/or sections should not be limited by these terms. These terms may be only used to distinguish one element, component, region, layer and/or section from another region, layer and/or section. Terms such as "first", "second", and other numerical terms when used herein do not imply a sequence or order unless clearly indicated by the context. Thus, a first element, component, region, layer and/or section discussed below could be termed a second element, component, region, layer and/or section without departing from the teachings of the embodiments.

As disclosed herein, the term "about" or "substantial" generally means within 20%, 10%, 5%, 3%, 2%, 1%, or 0.5% of a given value or range. Unless otherwise expressly specified, all of the numerical ranges, amounts, values and percentages disclosed herein should be understood as modified in all instances by the term "about" or "substantial". Accordingly, unless indicated to the contrary, the numerical parameters set forth in the present disclosure and attached claims are approximations that may vary as desired.

The present disclosure is directed to micro-electro-mechanical system (MEMS) devices including a cavity with precise dimensions and fabrication methods thereof. The cavity of the MEMS device is formed by etching a predetermined portion of the supporting substrate which is surrounded and defined by a stopper (or an etching stopper). The stopper includes a filling material and a liner wrapping around the sidewalls and the bottom surface of the filling material. Since the etching selectivity of the liner of the stopper to the supporting substrate is less than 1 (such as 0.8, 0.5, 0.1, 0.01 or any intervening values between them), portions of the supporting substrate which are covered with the stopper is not removed during the process of forming the cavity in the supporting substrate, thereby precisely controlling the dimensions of the cavity. Therefore, the device performances of the MEMS devices of the present disclosure are enhanced. Moreover, the fabrication methods of the MEMS devices according to embodiments of the present disclosure are less time-consuming, less fabrication cost, high production yield, precise dimension control for cavity and more flexibility in cavity depth than the conventional fabrication methods.

Figure 1B:
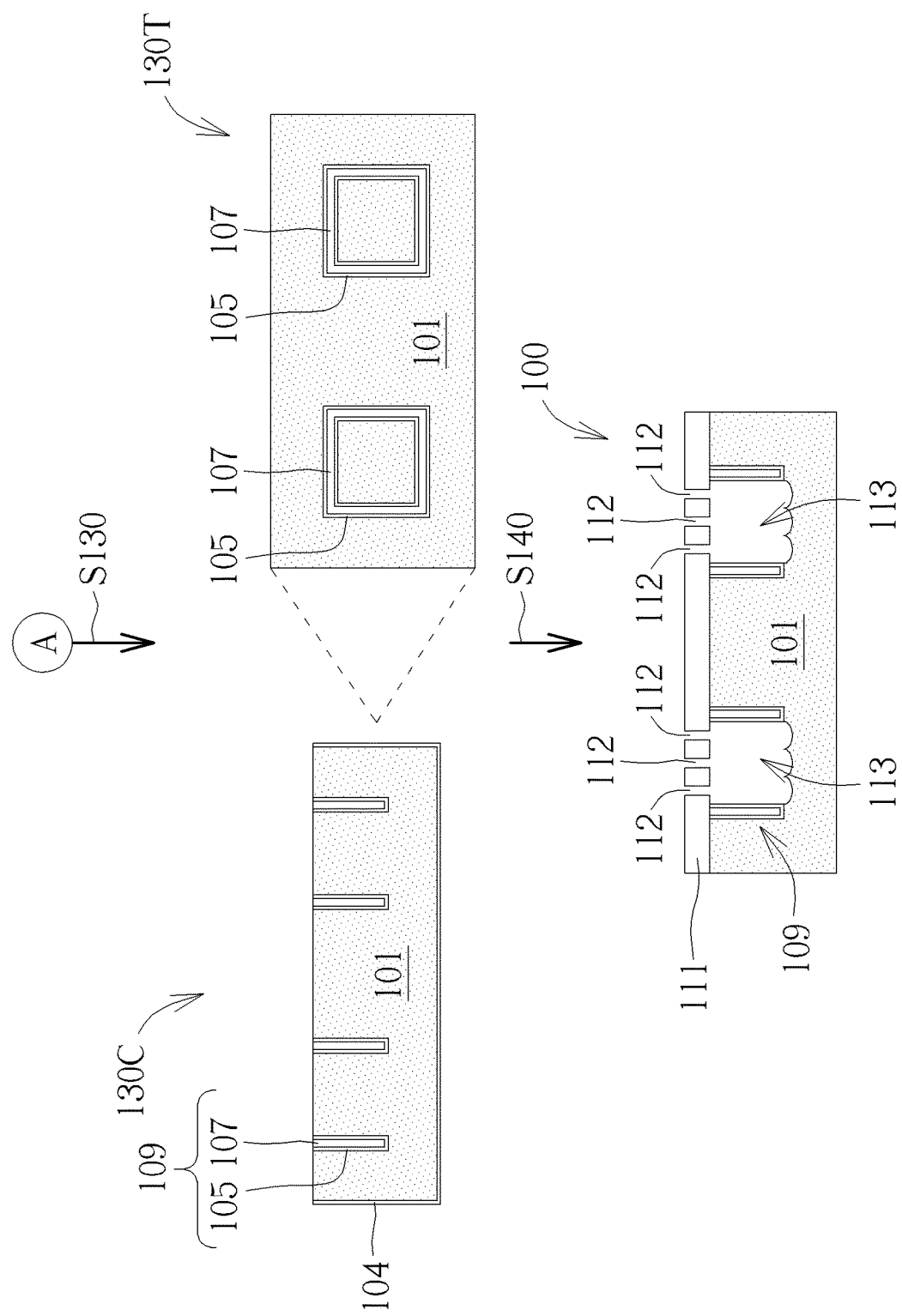

According to some embodiments of the present disclosure, methods of fabricating MEMS devices are provided. FIG. 1A to FIG. 1B shows schematic cross-sectional diagrams and some top views of several stages of a method of fabricating a MEMS device 100 according to one embodiment of the present disclosure. Referring to FIG. 1A, first, a supporting substrate 101 is provided. The supporting substrate 101 may be a Si wafer or other suitable semiconductor wafer. The material of the supporting substrate 101 includes a single crystal semiconductor material, such as silicon (Si), sapphire or other suitable semiconductor materials, for example elementary semiconductors such as such as Ge; compound semiconductors such as GaN, SiC, GaAs, GaP, InP, InAs, and/or InSb; alloy semiconductors such as SiGe, GaAsP, AlInAs, AlN, AlGaAs, GaInAs, GaInP, GaInAsP, or a combination thereof. Then, at step S110, the supporting substrate 101 is etched to form a plurality of trenches 103 on the upper surface thereof as shown in a cross-sectional view 110C and a top view 110T of FIG. 1A. In some embodiments, the trench 103 has a continuous or a discontinuous ring shape in a top view. Besides, when viewed from top-down perspective, the trench can be of any shape, such as a circle, ring, square, ellipse, polygon and so forth, but not limited thereto. The trench 103 surrounds a predetermined portion of the supporting substrate 101. The predetermined portion is used to define the location and depth of a cavity fabricated in the following process. Next, at step S120, a dielectric layer 104 such as a silicon oxide layer is conformally formed on the supporting substrate 101 and in the trenches 103 by a thermal growth process (such as a thermal oxidation process or a thermal nitridation process) or a plasma-enhanced chemical vapor disposition (PECVD) process from tetraethoxy silane (TEOS). Since the thermal growth process has better trench filling capacity than the PECVD process for forming a liner in the trench 103, the sidewalls and the bottom surface of the trench 103 can be completely covered with the liner when the liner is formed by the thermal growth process. Therefore, even if the aspect ratio (or trench depth to trench width ratio) of the trenches 103 is greater than 15 and the depth of the trench is deeper than 150 μm, the sidewalls and the bottom surface of the trench 103 can still be completely covered with the liner formed from the thermal growth process. Besides, for the thermally-grown liner, the liner 103 may be regarded a product of a reaction between the supporting substrate 101 and gaseous reactants, such as oxygen, nitrogen, a combination thereof, or other reactants capable of reacting with the supporting substrate 101.

The dielectric layer 104 may be formed to wrap around the supporting substrate 101 as shown in FIG. 1A. Then, a filling material layer 106 is formed on the dielectric layer 104 and fills up the trenches 103 by a deposition process such as a physical vapor disposition (PVD) process. The filling material layer 106 may be formed over the upper surface of the supporting substrate 101 as shown in FIG. 1A or to wrap around the supporting substrate 101 (not shown). The filling material layer 106 includes polysilicon or a dielectric material such as silicon oxide, silicon nitride, or a combination thereof. Since the filling material layer 106 is formed by deposition, due to its limited trench filling ability, a portion of the filling material deposited in the trench 103 may include voids located at the bottom and/or the middle of the trench 103.

Subsequently, referring to FIG. 1B, at step S130, the filling material layer 106 and the dielectric layer 104 are planarized to form a stopper 109 as shown in a cross-sectional view 130C and a top view 130T of FIG. 1B, where the stopper 109 includes a liner 105 and a filling material 107. The filling material layer 106 and the dielectric layer 104 may be planarized by a chemical-mechanical planarization (CMP) process until a top surface of the stopper 109 is level with the top surface of the supporting substrate 101.

The stopper 109 may have a continuous or a discontinuous ring shape in a top view. The stopper 109 surrounds a predetermined portion of the supporting substrate 101 for forming a cavity. Moreover, the stopper 109 may have an aspect ratio of 10 to 20, and the height of the stopper 109 may be in a range of about 20 µm to about 300 µm. In some embodiments, the height of the stopper 109, the depth of the trench 103 and the depth of the cavity may be in a range of about 20 µm to about 300 µm, for example about 150 µm or about 250 µm, the thickness of the liner 105 may be in a range of about 0.1 µm to about 3.0 µm, and the thickness of the filling material 107 may be in a range of about 7 µm to about 15 µm, but not limited thereto.

Next, at step S140, another wafer (not shown on the figure) is attached on the stopper 109 and the supporting substrate 101. Then the attached wafer is patterned to form a MEMS structure 111, where the MEMS structure 111 includes a plurality of through holes 112. The MEMS structure 111 includes a MEMS resonator and filters, a capacitive micro-machined ultrasonic transducer (CMUT), a piezoelectric micro-machined ultrasonic transducer (PMUT), a MEMS accelerometer, a MEMS gyroscope, inertial sensors, pressure sensors, micro-fluidic devices, other micro devices or a combination thereof. Then, the predetermined portion of the supporting substrate 101 surrounded by the stopper 109 is etched to form a cavity 113 by providing an etchant through the through holes 112. During the etching process, the stopper 109 is used as an etch stopper to precisely define the lateral dimension (such as diameter) of the cavity 113. Besides, even if the liner 105 of the stopper 109 is a thin layer with a thickness of less than 3 µm (such as 1.0, 1.5, 2.0, 2.5 or any intervening values therebetween), the stopper 109 as a whole can have high mechanical strength and would not break during the etching process because the filling material 107 is used to enhance the mechanical strength of the stopper 109.

Afterwards, the supporting substrate 101 and the MEMS structure 111 may be patterned by an etching process to form a MEMS device 100. After the etching process, the dielectric layer 104 and the filling material layer 106 on the sidewalls and the bottom surface of the supporting substrate 101 are removed. In the MEMS device 100, the MEMS structure 111 is disposed over the cavity 113, and the stopper 109 is disposed between the supporting substrate 101 and the cavity 103. Moreover, the stopper 109 is disposed along an inner sidewall of the supporting substrate 101, and an inner sidewall of the stopper 109 is in contact with the cavity 113. The stopper 109 includes the filling material 107 and the liner 105, where the filling material 107 surrounds the periphery of the cavity 113 when viewed from a top down perspective, and the liner 105 wraps around at least the sidewalls and bottom surface of the filling material 107. Moreover, the liner 105 is disposed between the cavity 103 and the supporting substrate 101. The liner 105 extends from a first region at the bottom of the filling material 107 to a second region between a sidewall of the filling material 107 and the supporting substrate 101 and to a third region between another sidewall of the filling material 107 and the cavity 113. In addition, the liner 105 is a thin layer, and a slit surrounded and defined by the liner 105 is filled with the filling material 107.

According to the embodiment of the present disclosure, the depth of the cavity 113 is substantially the same as the height of the stopper 109, and the dimensions of the cavity 113 such as the width, the length and the diameter are precisely controlled by the stopper 109 due to the etching selectivity of the liner 105 of the stopper 109 to the supporting substrate 101 is less than 1 (such as 0.8, 0.5, 0.1, 0.01 or any intervening values between them), such that the etching of the supporting substrate 101 is stopped on liner 105 of the stopper 109. In the embodiment, the bottom surface of the cavity 113 may have concave portions corresponding to the locations of the through holes 112 of the MEMS structure 111.

Figure 2A:
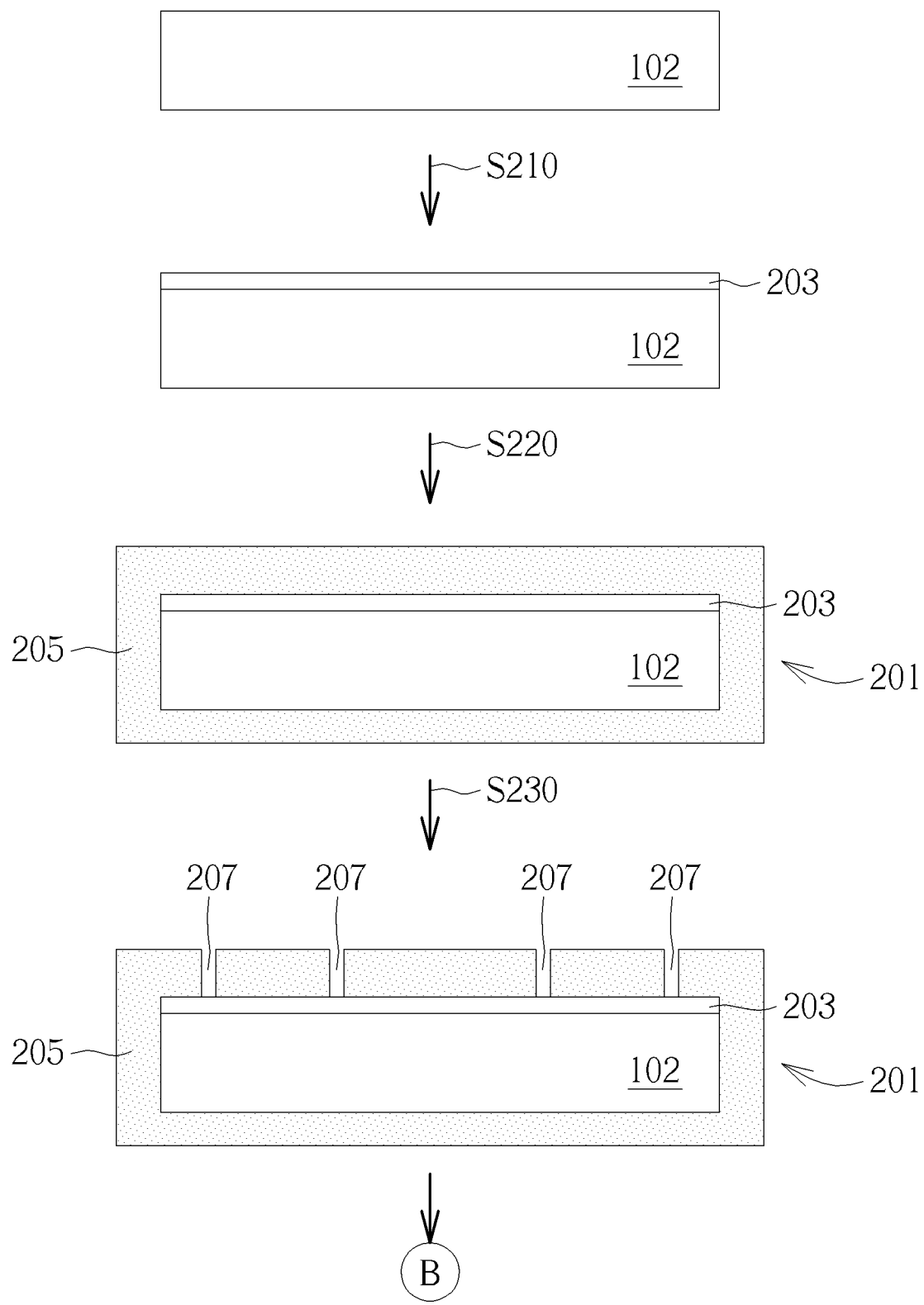
FIG. 2A to FIG. 2B shows schematic cross-sectional diagrams of several stages of a method of fabricating a MEMS device according to another embodiment of the present disclosure.
Figure 2B:
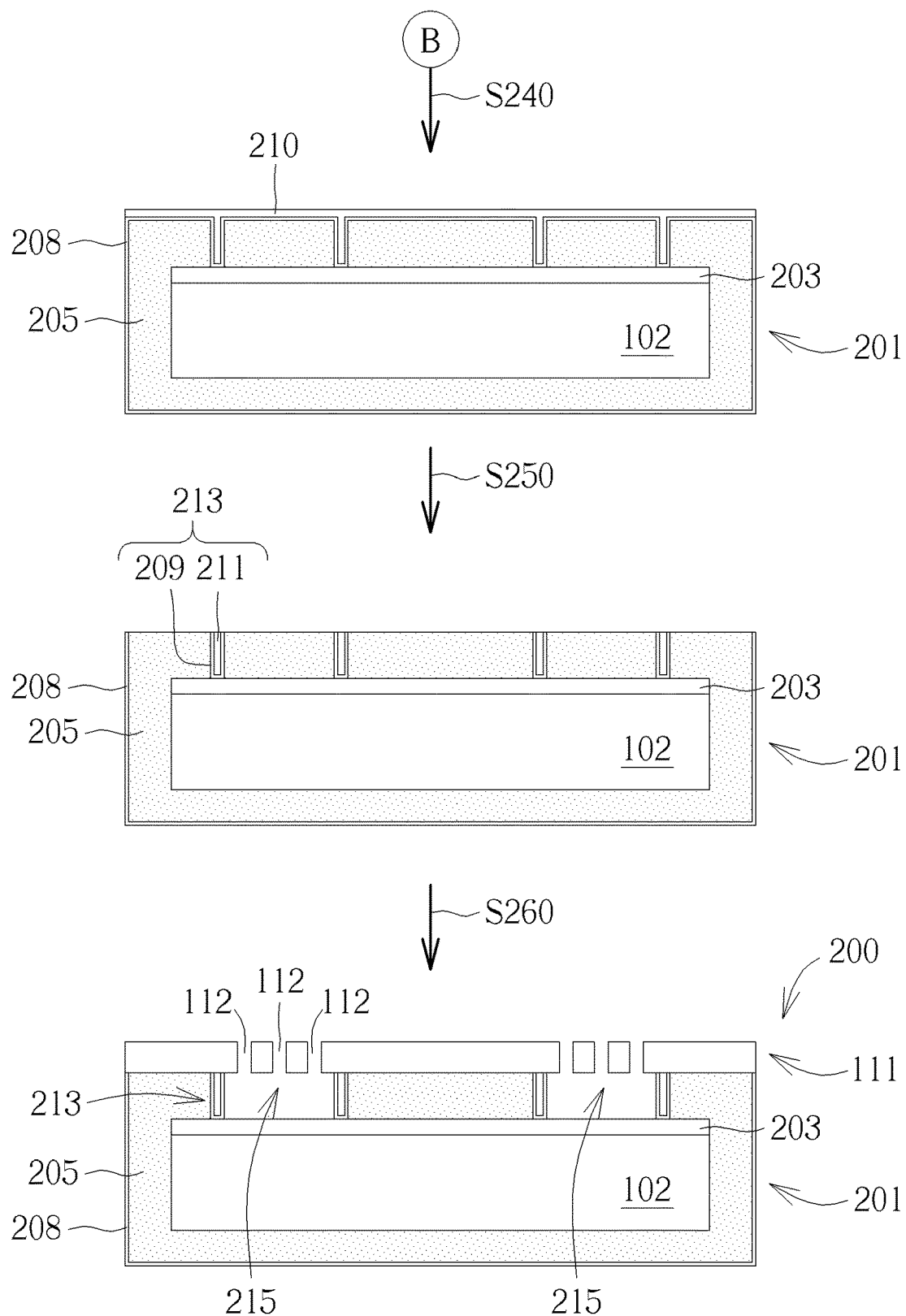

FIG. 2A to FIG. 2B shows schematic cross-sectional diagrams of several stages of a method of fabricating a MEMS device 200 according to another embodiment of the present disclosure. Referring to FIG. 2A, first, a core substrate 102 is provided. The core substrate 102 is such as a Si wafer or other suitable semiconductor wafer. The material of the core substrate 102 may refer to the aforementioned description of the supporting substrate 101 in FIG. 1A. Next, at step S210, a dielectric layer 203 is formed on the core substrate 102. The dielectric layer 203 may be a silicon oxide layer formed by thermal oxidation, PECVD from tetraethoxy silane (TEOS) or PVD. In some embodiments, the dielectric layer 203 is deposited on the upper surface of the core substrate 102. In other embodiments, the dielectric layer 203 may be conformally formed to wrap around the core substrate 102. According to the embodiment of the present disclosure, the dielectric layer 203 is used as a bottom stopper and may be referred to as the bottom stopper 203 thereafter.

Next, at step S220, a semiconductor layer 205 is deposited to wrap around the bottom stopper 203 and the core substrate 102 to form a supporting substrate 201. The semiconductor layer 205 includes polysilicon or other suitable semiconductor materials. In the embodiment, the supporting substrate 201 includes the core substrate 102, the bottom stopper 203 and the semiconductor layer 205.

Thereafter, at step 230, the semiconductor layer 205 is etched to form a plurality of trenches 207 therein. According to the embodiment of the present disclosure, the etching of the semiconductor layer 205 is stopped on the bottom stopper 203. The trench 207 and the bottom stopper 203 define a predetermined portion of the semiconductor layer 205 for forming a cavity.

Subsequently, referring to FIG. 2B, at step S240, a dielectric layer 208 such as a silicon oxide layer is conformally formed on the semiconductor layer 205 of the supporting substrate 201 and in the trench 207 by a thermal oxidation process or a PECVD process from tetraethoxy silane (TEOS). The thermal oxidation process has better trench filling capacity than the PECVD process for forming a liner in the trench 207. Then, a filling material layer 210 is formed on the dielectric layer 208 and fills up the trenches 207 by a deposition process such as CVD or PVD process. The filling material layer 210 includes polysilicon or a dielectric material, and a portion of the filling material deposited at the bottom and/or the middle of the trench 207 includes voids. The other details of the dielectric layer 208 and the filling material layer 210 may refer to the aforementioned description of the dielectric layer 104 and the filling material layer 104 in FIG. 1A.

Next, at step S250, the filling material layer 210 and the dielectric layer 208 are planarized to form a stopper 213, where the stopper 213 includes a liner 209 and a filling material 211. The filling material layer 210 and the dielectric layer 208 may be planarized by a CMP process until a top surface of the stopper 213 is level with the top surface of the semiconductor layer 205 of the supporting substrate 201. After the CMP process, the dielectric layer 208 and the filling material layer 210 may be remained on the sidewalls and the bottom surface of the semiconductor layer 205 of the supporting substrate 201. The stopper 213 may have a continuous or a discontinuous ring shape in a top view. The stopper 213 surrounds a predetermined portion of the semiconductor layer 205 for forming a cavity. Moreover, the stopper 213 may have an aspect ratio of 10 to 20, and the height of the stopper 213 may be in a range of about 20 μm to about 300 μm, for example, about 150 μm or about 250 μm. The thickness of the liner 209 may be in a range of about 0.1 μm to about 3.0 μm, and the thickness of the filling material 211 may be in a range of about 7 μm to about 15 μm, but not limited thereto.

Thereafter, at step S260, another wafer (not shown) is attached on the stopper 213 and the supporting substrate 201. Then the attached wafer is patterned to form a MEMS structure 111, where the MEMS structure 111 includes a plurality of through holes 112. Then, the predetermined portion of the semiconductor layer 205 surrounded by the stopper 213 is etched to form a cavity 215 by providing an etchant through the through holes 112 of the MEMS structure 111, and then a MEMS device 200 is formed. Afterwards, the supporting substrate 201 and the MEMS structure 111 may be patterned by etching process, and then the dielectric layer 208 and the filling material layer 210 on the sidewalls and the bottom surface of the supporting substrate 201 may be removed. In the MEMS device 200, the MEMS structure 111 is disposed over the cavity 215, and the stopper 213 is disposed between the semiconductor layer 205 of the supporting substrate 201 and the cavity 215. Moreover, the stopper 213 is disposed along an inner sidewall of the semiconductor layer 205, and an inner sidewall of the stopper 215 and a partial surface of the bottom stopper 203 are in contact with the cavity 215.

According to the embodiment of the present disclosure, the depth of the cavity 215 is substantially the same as the height of the stopper 213. Moreover, the dimensions of the cavity 215 such as the width, the length, the diameter, and the depth are precisely controlled by the stopper 213 and the bottom stopper 203 due to the etching selectivities of the liner 209 of the stopper 213 and the bottom stopper 203 to the semiconductor layer 205 are less than 1 (such as 0.8, 0.5, 0.1, 0.01 or any intervening values between them), such that the etching of the semiconductor layer 205 is stopped on the stopper 213 and the bottom stopper 203. In the embodiment, the bottom surface of the cavity 215 is the upper surface of the bottom stopper 203.

Figure 3A:
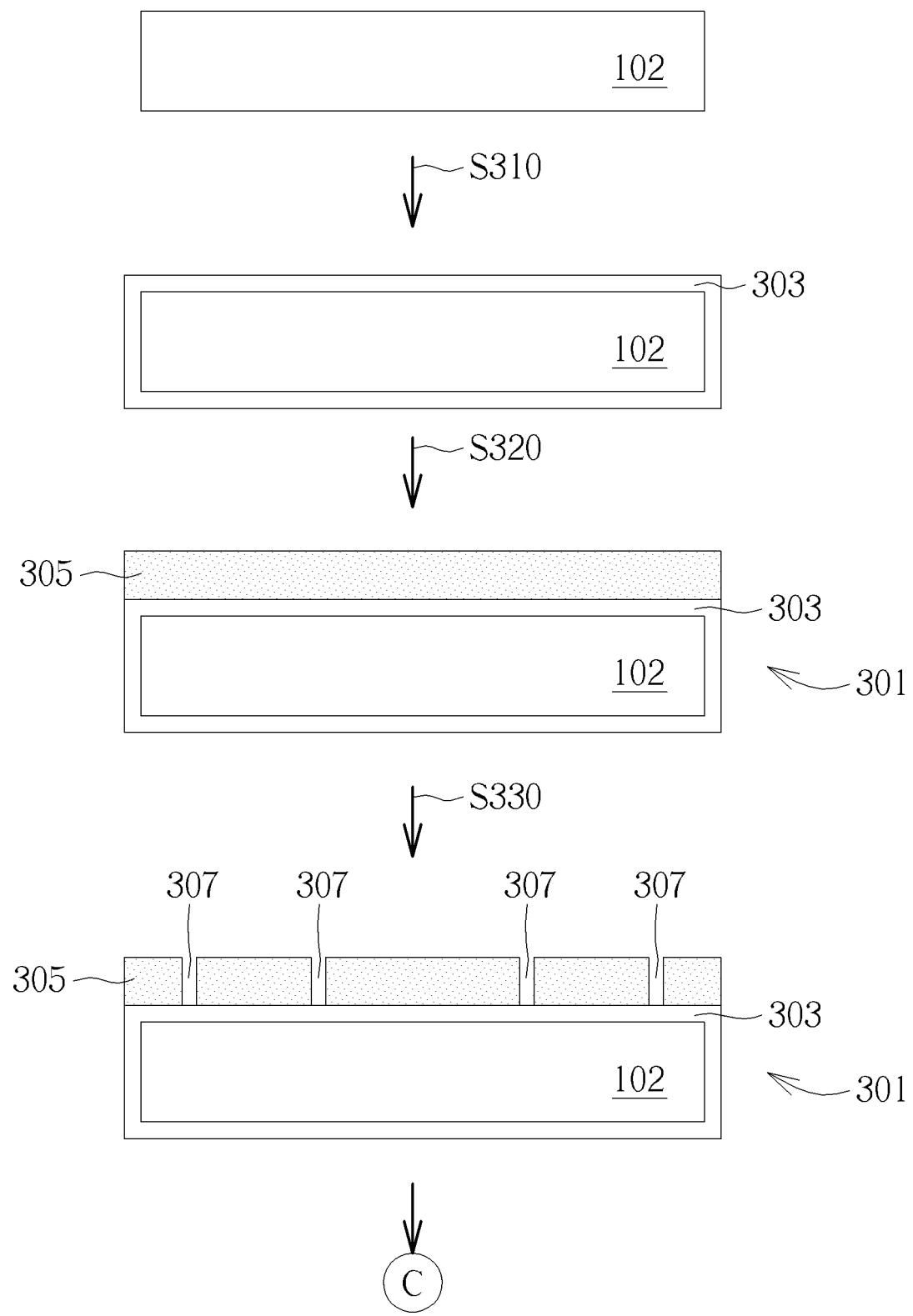
FIG. 3A to FIG. 3B shows schematic cross-sectional diagrams of several stages of a method of fabricating a MEMS device according to another embodiment of the present disclosure.
Figure 3B:
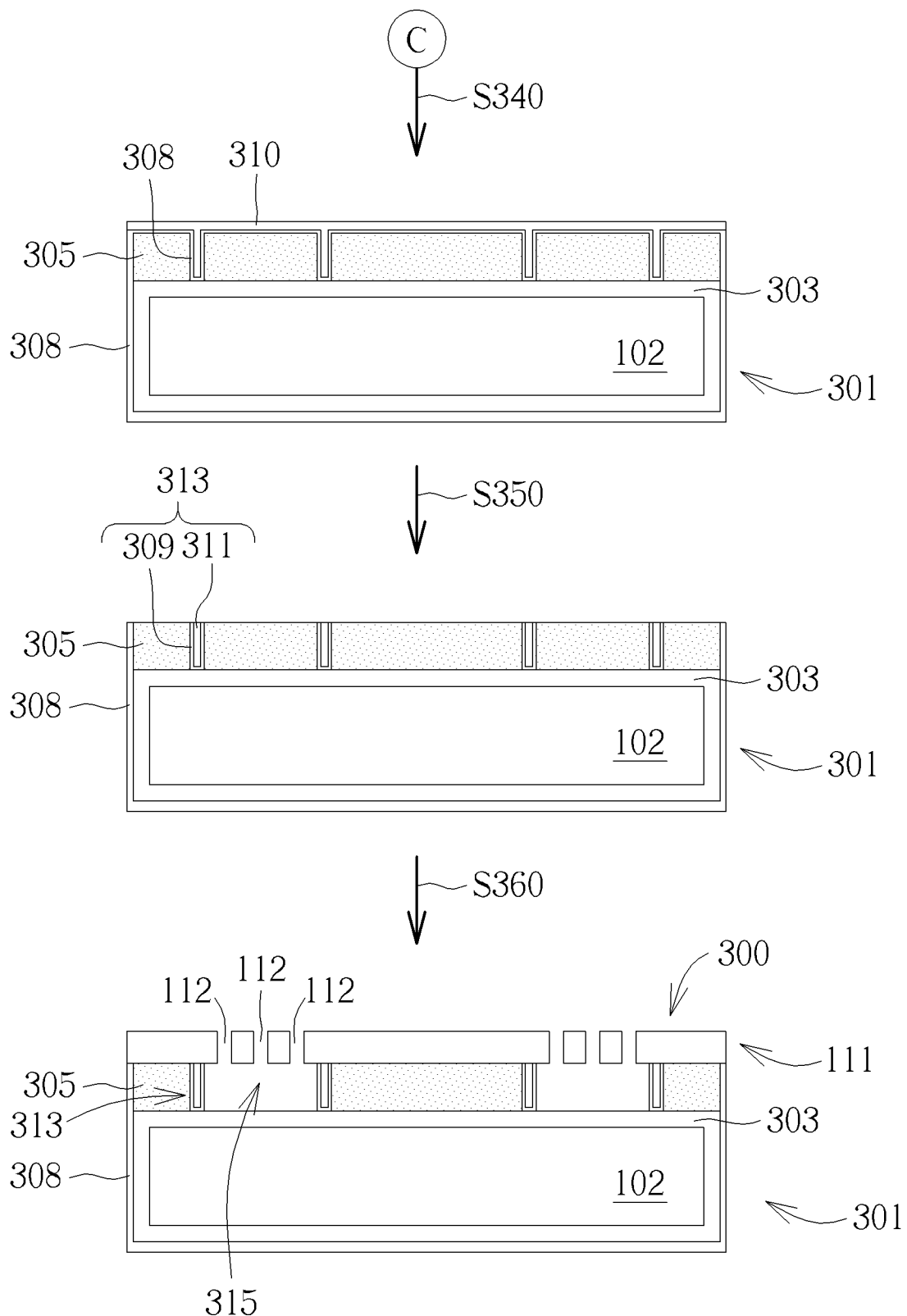

FIG. 3A to FIG. 3B shows schematic cross-sectional diagrams of several stages of a method of fabricating a MEMS device 300 according to another embodiment of the present disclosure. Referring to FIG. 3A, first, a core substrate 102 is provided. The core substrate 102 is such as a Si wafer or other suitable semiconductor wafer. The material of the core substrate 102 may refer to the aforementioned description of the supporting substrate 101 in FIG. 1A. Next, at step S310, a dielectric layer 303 is conformally formed to wrap around the core substrate 102. The dielectric layer 303 may be a silicon oxide layer formed by thermal oxidation or PECVD from tetraethoxy silane (TEOS). According to the embodiment of the present disclosure, an upper portion of the dielectric layer 303 is used as a bottom stopper and may be referred to as the bottom stopper 303 thereafter.

Next, at step S320, a semiconductor layer 305 is deposited on the bottom stopper 303 to form a supporting substrate 301. The semiconductor layer 305 includes amorphous silicon or other suitable semiconductor materials. The semiconductor layer 305 may be deposited on the upper surface of the bottom stopper 303 by PVD process. In the embodiment, the supporting substrate 301 includes the core substrate 102, the bottom stopper 303 and the semiconductor layer 305.

Thereafter, at step 330, the semiconductor layer 305 is etched to form a plurality of trenches 307 therein. According to the embodiment of the present disclosure, the etching of the semiconductor layer 305 is stopped on the bottom stopper 303. The trench 307 and the bottom stopper 303 define a predetermined portion of the semiconductor layer 305 for forming a cavity.

Subsequently, referring to FIG. 3B, at step S340, a dielectric layer 308 such as a silicon oxide layer or a silicon nitride layer is conformally formed on the supporting substrate 301 and in the trench 307. The dielectric layer 308 may be formed on the upper surface and the sidewalls of the semiconductor layer 305 and on the sidewalls and the bottom surface of the dielectric layer 303 to wrap around the supporting substrate 301. The dielectric layer 308 may be formed by a thermal growth process (such as a thermal oxidation process or a thermal nitridation process) or a PECVD process from tetraethoxy silane (TEOS). The thermal growth process has better trench filling capacity than the PECVD process for forming a liner in the trench 307. Then, a filling material layer 310 is formed on the dielectric layer 308 and fills up the trenches 307. The filling material layer 310 includes polysilicon or a dielectric material such as silicon oxide, silicon nitride, or other suitable dielectric materials. The filling material layer 310 may be formed on the upper surface of the semiconductor layer 305 by PVD process or wrap around the supporting substrate 301 by CVD process. In addition, a portion of the filling material deposited at the bottom and/or the middle of the trench 307 includes voids.

Next, at step S350, the filling material layer 310 and the dielectric layer 308 are planarized to form a stopper 313, where the stopper 313 includes a liner 309 and a filling material 311. The filling material layer 310 and the dielectric layer 308 may be planarized by a CMP process until a top surface of the stopper 313 is level with the top surface of the semiconductor layer 305 of the supporting substrate 301. After the CMP process, the dielectric layer 308 and the filling material layer 310 may be remained on the sidewalls and the bottom surface of the supporting substrate 301. The details of the stopper 313, such as the top-view shape, the aspect ratio, the height, the thicknesses of the liner 309 and the filling material 311 may refer to the aforementioned description of the stopper 213 in FIG. 2B. The stopper 313 surrounds a predetermined portion of the semiconductor layer 305 for forming a cavity.

Thereafter, at step S360, another wafer (not shown) is attached on the stopper 313 and the supporting substrate 301. Then the attached wafer is patterned to form a MEMS structure 111, where the MEMS structure 111 includes a plurality of through holes 112. Then, the predetermined portion of the semiconductor layer 305 surrounded by the stopper 313 is etched to form a cavity 315 by providing an etchant through the through holes 112, and then a MEMS device 300 is formed. Afterwards, the supporting substrate 301 and the MEMS structure 111 may be patterned by an etching process. After the etching process, the dielectric layer 308 and the filling material layer 310 on the sidewalls and the bottom surface of the supporting substrate 301 are removed. Moreover, the lower portion and the sidewall portions of the dielectric layer 303 on the bottom surface and the sidewalls of the core substrate 102 may be also removed. In the MEMS device 300, the MEMS structure 111 is disposed over the cavity 315, and the stopper 313 is disposed between the semiconductor layer 305 and the cavity 315. Moreover, the stopper 313 is disposed along an inner sidewall of the semiconductor layer 305, and an inner sidewall of the stopper 315 and the upper surface of the bottom stopper 303 are in contact with the cavity 315.

According to the embodiment of the present disclosure, the depth of the cavity 315 is substantially the same as the height of the stopper 313. Moreover, the dimensions of the cavity 315 such as the width, the length, the diameter, and the depth are precisely controlled by the stopper 313 and the bottom stopper 303 due to the etching selectivities of the liner 309 of the stopper 313 and the bottom stopper 303 to the semiconductor layer 305 are less than 1 (such as 0.8, 0.5, 0.1, 0.01 or any intervening values between them), such that the etching of the semiconductor layer 305 is stopped on the stopper 313 and the bottom stopper 303.

Figure 4:
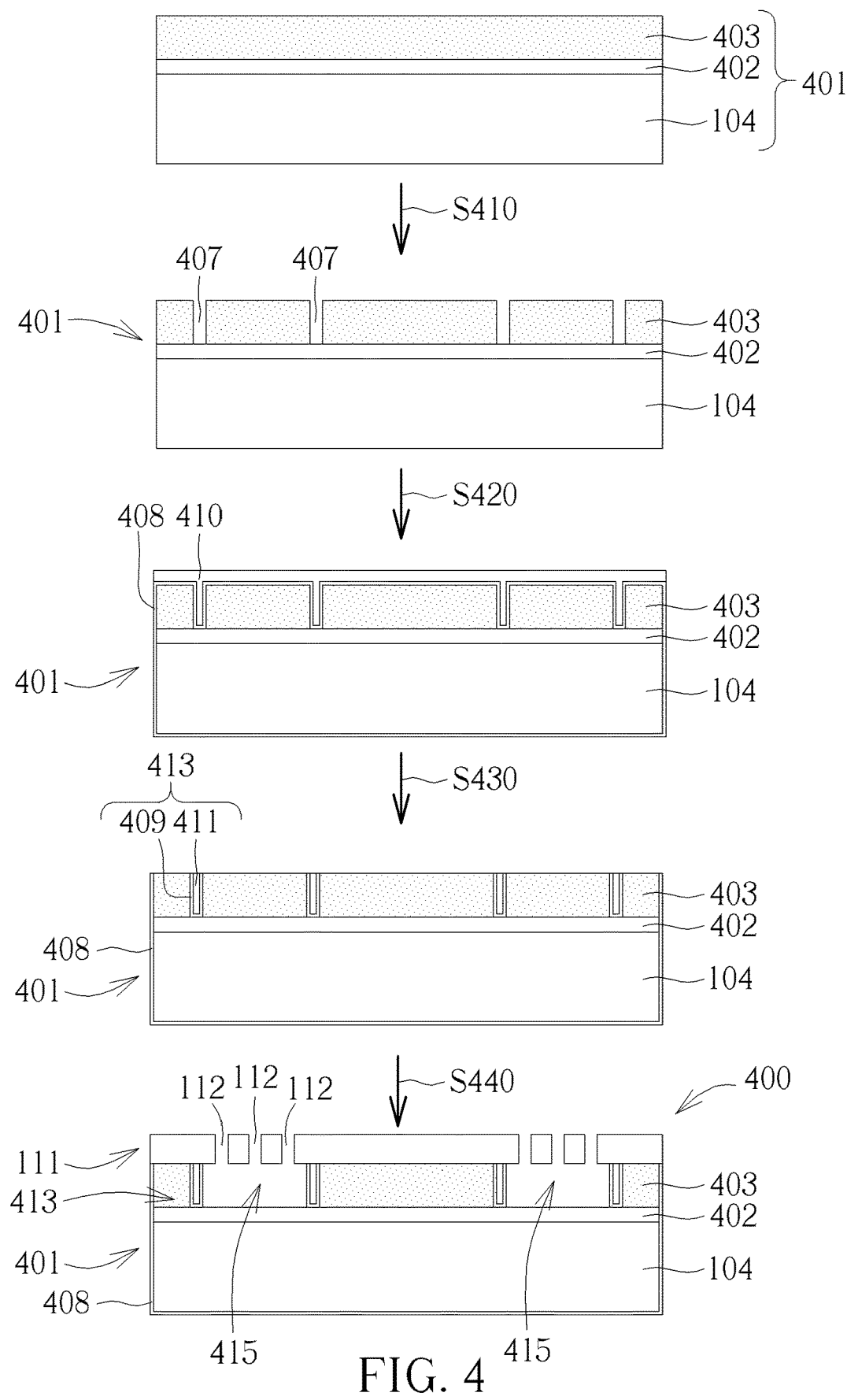
FIG. 4 shows schematic cross-sectional diagrams of several stages of a method of fabricating a MEMS device according to another embodiment of the present disclosure.

FIG. 4 shows schematic cross-sectional diagrams of several stages of a method of fabricating a MEMS device 400 according to another embodiment of the present disclosure. Referring to FIG. 4, first, a supporting substrate 401 is provided. The supporting substrate 401 includes a semiconductor substrate 104, an insulating layer 402 on the semiconductor substrate 104, and a semiconductor layer 403 on the insulating layer 402. The semiconductor substrate 104 is such as a Si wafer or other suitable semiconductor wafer. The material of the semiconductor substrate 104 may refer to the aforementioned description of the supporting substrate 101 in FIG. 1A. The insulating layer 402 may be a buried oxide layer and is used as a bottom stopper, which may be referred to as the bottom stopper 402 thereafter. The semiconductor layer 403 includes single-crystalline silicon or other suitable semiconductor materials. In the embodiment, the thickness of the semiconductor layer 403 may be between about 20 μm and about 200 μm. In the embodiment of the present disclosure, the supporting substrate 401 may be a semiconductor-on-insulator (SOI) wafer which is used to form a shallow cavity for MEMS devices.

Next, at step S410, the semiconductor layer 403 is etched to form a plurality of trenches 407 therein. According to the embodiment of the present disclosure, the etching of the semiconductor layer 403 is stopped on the bottom stopper 402. The trench 407 and the bottom stopper 402 define a predetermined portion of the semiconductor layer 403 for forming a cavity.

Thereafter, at step S420, a dielectric layer 408 such as a silicon oxide layer or a silicon nitride layer is conformally formed on the supporting substrate 401 and in the trench 407. The dielectric layer 408 is formed on the upper surface and the sidewalls of the semiconductor layer 403, on the sidewalls of the bottom stopper 402 and on the sidewalls and the bottom surface of the semiconductor substrate 104. The dielectric layer 408 may be formed by a thermal growth process (such as a thermal oxidation process or a thermal nitridation process) or a PECVD process from tetraethoxy silane (TEOS). The thermal growth process has better trench filling capacity than the PECVD process for forming a liner in the trench 407. Then, a filling material layer 410 is formed on the dielectric layer 408 and fills up the trenches 407. The filling material layer 410 includes polysilicon or a dielectric material. The filling material layer 410 may be formed on the upper surface of the supporting substrate 401 by a PVD process, or wrap around the supporting substrate 401 by a CVD process. In addition, a portion of the filling material deposited at the bottom and/or the middle of the trench 407 includes voids.

Next, at step S430, the filling material layer 410 and the dielectric layer 408 are planarized to form a stopper 413, where the stopper 413 includes a liner 409 and a filling material 411. The filling material layer 410 and the dielectric layer 408 may be planarized by a CMP process until a top surface of the stopper 413 is level with the top surface of the semiconductor layer 403 of the supporting substrate 401. After the CMP process, the dielectric layer 408 and the filling material layer 410 may be remained on the sidewalls and the bottom surface of the supporting substrate 401. The stopper 413 may have a continuous or a discontinuous ring shape in a top view to surround a predetermined portion of the semiconductor layer 403 for forming a cavity. Moreover, the stopper 413 may have an aspect ratio of 10 to 20, and the height of the stopper 213 may be in a range of about 20 μm to about 300 μm, for example, about 50 μm or about 100 μm. The thickness of the liner 409 may be in a range of about 0.1 μm to about 3.0 μm, and the thickness of the filling material 411 may be in a range of about 7 μm to about 15 μm, but not limited thereto.

Thereafter, at step S440, another wafer (not shown) is attached on the stopper 413 and the supporting substrate 401. Then the attached wafer is patterned to form a MEMS structure 111, where the MEMS structure 111 includes a plurality of through holes 112. Then, the predetermined portion of the semiconductor layer 403 is etched to form a cavity 415 by providing an etchant through the through holes 112, and then a MEMS device 400 is formed. Afterwards, the supporting substrate 401 and the MEMS structure 111 may be patterned by etching process. After the etching process, the dielectric layer 408 and the filling material layer 410 on the sidewalls and the bottom surface of the supporting substrate 401 may be removed. In the MEMS device 400, the MEMS structure 111 is disposed over the cavity 415, and the stopper 413 is disposed between the semiconductor layer 403 and the cavity 415. Moreover, the stopper 413 is disposed along an inner sidewall of the semiconductor layer 403, and an inner sidewall of the stopper 413 and the upper surface of the bottom stopper 402 are in contact with the cavity 415.

According to the embodiment of the present disclosure, the depth of the cavity 415 is substantially the same as the height of the stopper 413. In some embodiments, the height of the stopper 413 may be determined by the thickness of the semiconductor layer 403 of an SOI wafer, such that the cavity 415 may be shallow. Moreover, the dimensions of the cavity 315 such as the width, the length, the diameter, and the depth are precisely controlled by the stopper 413 and the bottom stopper 402 due to the etching selectivities of the liner 409 of the stopper 413 and the bottom stopper 402 to the semiconductor layer 403 are less than 1 (such as 0.8, 0.5, 0.1, 0.01 or any intervening values between them), such that the etching of the semiconductor layer 403 is stopped on the stopper 413 and the bottom stopper 402.

Figure 5:
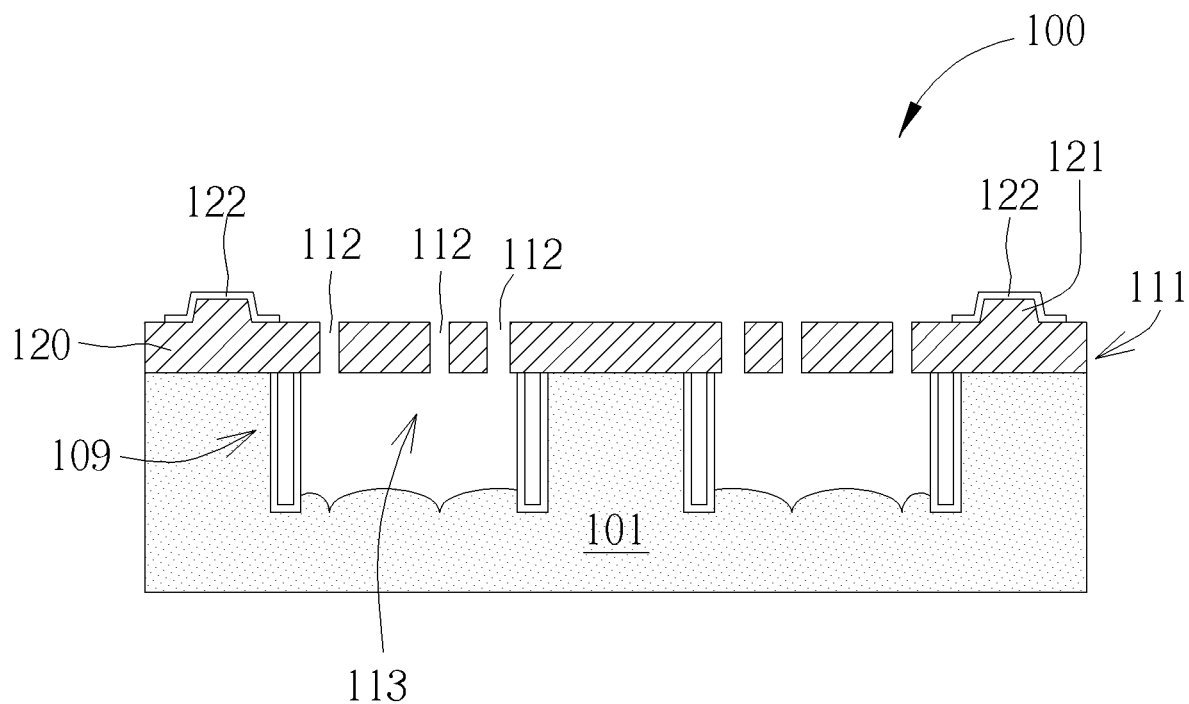
FIG. 5 shows a schematic cross-sectional diagram of a MEMS device according to one embodiment of the present disclosure.

FIG. 5 shows a schematic cross-sectional diagram of a MEMS device 100 according to one embodiment of the present disclosure. As shown in FIG. 5, in one embodiment, the MEMS device 100 includes a supporting substrate 101, a stopper 109, a cavity 113 and a MEMS structure 111. The details of the supporting substrate 101, the stopper 109 and the cavity 113 may refer to the aforementioned description of FIG. 1B. In the embodiment, the MEMS structure 111 is a MEMS accelerometer and gyroscope which is formed by patterning a device layer 120 to form multiple protruding portions 121 and multiple through holes 112 that are connected with the cavities 113 of the supporting substrate 101. The device layer 120 includes polysilicon or other suitable semiconductor materials. In addition, the MEMS structure 111 further includes several conductive wires 122 formed on the protruding portions 121. In a case where the MEMS device 100 is an accelerometer or gyroscope, a portion of the device layer 120 suspended over the cavity 113 may function as a movable proof mass. During the operation of the MEMS device 100, the movable proof mass may be displaced from its original place when an external force is applied to the MEMS device 100. The degree of the displacement of the movable proof mass is partly affected by the mass of the movable proof mass and the dimensions of the cavity 113. In other embodiments, the supporting substrate 101 under the MEMS structure 111 of the MEMS device 100 may be replaced with the supporting substrate 201 of FIG. 2B, the supporting substrate 301 of FIG. 3B, or the supporting substrate 401 of FIG. 4.

Figure 6:
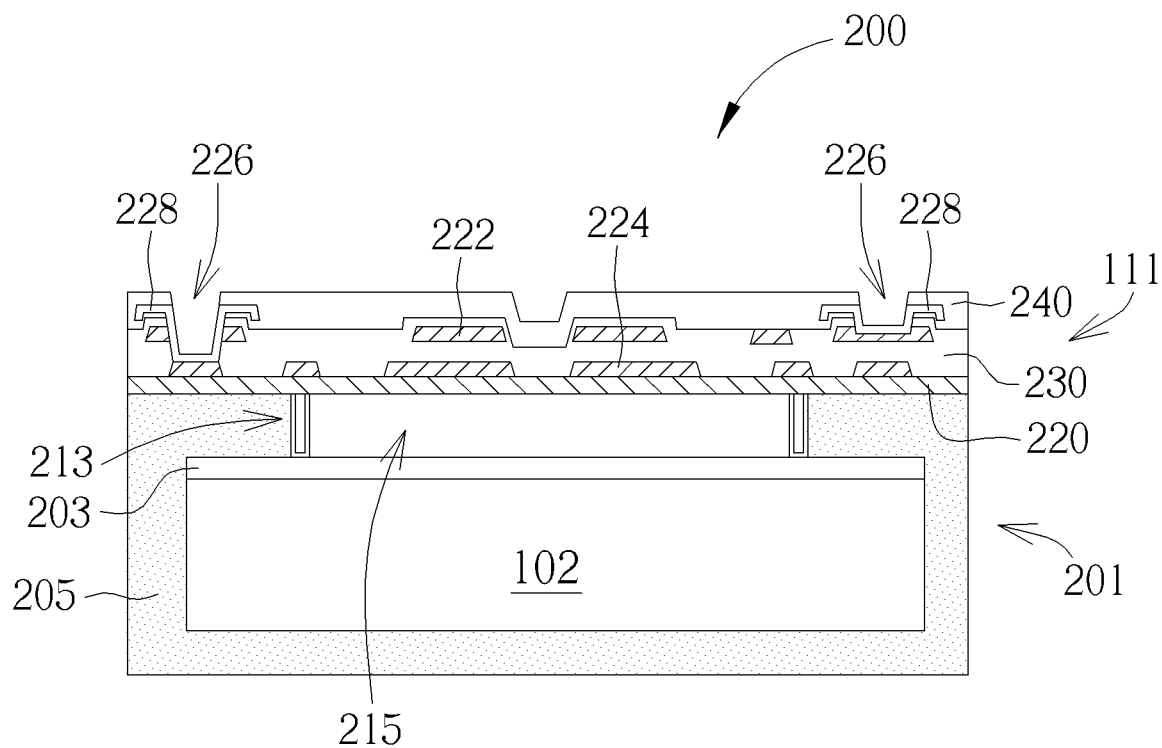
FIG. 6 shows a schematic cross-sectional diagram of a MEMS device according to another embodiment of the present disclosure.

FIG. 6 shows a schematic cross-sectional diagram of a MEMS device 200 according to another embodiment of the present disclosure. As shown in FIG. 6, in one embodiment, the MEMS device 200 includes a supporting substrate 201, a stopper 213, a cavity 215 and a MEMS structure 111. The details of the supporting substrate 201, the stopper 213 and the cavity 215 may refer to the aforementioned description of FIG. 2B. In the embodiment, the MEMS structure 111 is a piezoelectric micro-machined ultrasonic transducer (PMUT) that includes a device layer 220 disposed on the supporting substrate 201 and over the cavity 215, and a piezoelectric material layer 230 disposed between an upper electrode layer 222 and a lower electrode layer 224. The device layer 220 includes polysilicon or other suitable semiconductor materials. In addition, the MEMS structure 111 further includes a dielectric layer 240 disposed on the piezoelectric material layer 230, the upper electrode layer 222 and the lower electrode layer 224. The dielectric layer 240 has at least two contact vias 226 respectively electrically connected to a portion of the lower electrode layer 224 and a portion of the upper electrode layer 222. For example, the conductive wires 228 connected to the electrodes can be electrically connected to an external circuit (not shown in FIG. 6) through the contact vias 226. During the operation of the MEMS device 200, the membrane suspended above the cavity 215 may vibrate at a predetermined frequency which is partly affected by the thickness and the elasticity of the device layer 220 and the dimensions of the cavity 215. In addition, the through holes 112 of the MEMS structure 111 as shown in FIG. 2B may be filled up with a passivation layer after the cavity 215 is formed, or some through holes 112 may be remained in the MEMS structure 111 (not shown in FIG. 6). In other embodiments, the supporting substrate 201 under the MEMS structure 111 of the MEMS device 200 may be replaced with the supporting substrate 101 of FIG. 1B, the supporting substrate 301 of FIG. 3B, or the supporting substrate 401 of FIG. 4.

Figure 7:
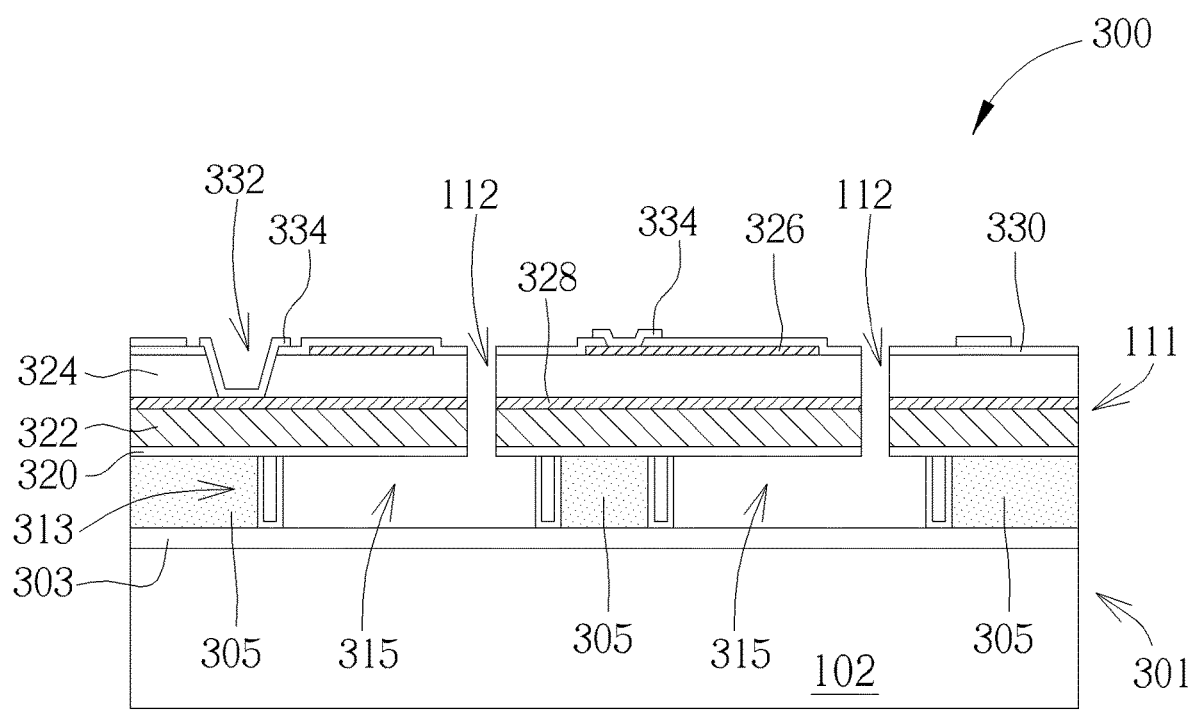
FIG. 7 shows a schematic cross-sectional diagram of a MEMS device according to another embodiment of the present disclosure.

FIG. 7 shows a schematic cross-sectional diagram of a MEMS device 300 according to another embodiment of the present disclosure. As shown in FIG. 7, in one embodiment, the MEMS device 300 includes a supporting substrate 301, a stopper 313, a cavity 315 and a MEMS structure 111. The details of the supporting substrate 301, the stopper 313 and the cavity 315 may refer to the aforementioned description of FIG. 3B. In addition, the supporting substrate 301 as shown in FIG. 7 is patterned after an etching process. In the embodiment, the MEMS structure 111 is a MEMS resonator and filters. The MEMS structure 111 includes an insulating layer 320 and a device layer 322 disposed on the supporting substrate 301 and over the cavity 315 in sequence, and a piezoelectric material layer 324 disposed between an upper electrode layer 326 and a lower electrode layer 328. The piezoelectric material layer 324 has an opening 332 to expose a portion of the lower electrode layer 328. A conductive wire 334 is conformally disposed on the sidewalls and the bottom of the opening 332 for electrically connecting the lower electrode layer 328 to an external circuit (not shown in FIG. 7). A protection layer 330 is disposed on the upper electrode layer 326 and has an opening to expose a portion of the upper electrode layer 326. Another conductive wire 334 is disposed on the portion of the upper electrode layer 326 for electrically connecting to the external circuit (not shown in FIG. 7). In addition, the through holes 112 of the MEMS structure 111 are in contact with and connected with the cavities 315 of the supporting substrate 301. During the operation of the MEMS device 300, the membrane suspended above the cavity 315 may vibrate at a predetermined resonance frequency which is partly affected by the thickness and the elasticity of the device layer 322 and the dimensions of the cavity 315. In other embodiments, the supporting substrate 301 under the MEMS structure 111 of the MEMS device 300 may be replaced with the supporting substrate 101 of FIG. 1B, the supporting substrate 201 of FIG. 2B, or the supporting substrate 401 of FIG. 4.

The MEMS structures 111 and the supporting substrates 101, 201 and 301 of the MEMS devices 100, 200 and 300 as shown in FIG. 5, FIG. 6, and FIG. 7 are illustrated for examples, but not limited thereto. The MEMS structures 111 of the MEMS devices 100, 200 and 300 include a MEMS resonator and filters, a capacitive micro-machined ultrasonic transducer (CMUT), a piezoelectric micro-machined ultrasonic transducer (PMUT), a MEMS accelerometer, a MEMS gyroscope, inertial sensors, pressure sensors, micro-fluidic devices, other micro devices or a combination thereof. Moreover, the supporting substrates 101, 201 and 301 of the MEMS devices 100, 200 and 300 may be taken from any one of the supporting substrates of the embodiments of the present disclosure.

According to the embodiments of the present disclosure, the etching selectivity of the liner of the stopper to the semiconductor material of the supporting substrate is less than 1 and the liner of the stopper has good trench filling capacity for deep trench. Accordingly, the stopper prevents a lateral undercut etching of the supporting substrate to precisely control the dimensions of the cavity. Furthermore, the etching of the supporting substrate in the depth is easily controlled by the stopper to provide the flexibility of cavity depth. Therefore, the dimensions of the cavity such as the width, the length, the diameter, and the depth are precisely controlled by the stopper. Moreover, in some embodiments, the etching of semiconductor material of the supporting substrates is stopped on the bottom stopper, such that the depth of the cavity is further precisely controlled by the bottom stopper. Therefore, the performances of the MEMS devices of the present disclosure are improved due to the cavities with precise dimensions.

In addition, according to the embodiments of the present disclosure, the thermal growth process (such as a thermal oxidation process or a thermal nitridation process) of forming the liner of the stopper has good trench filling capacity for the trench with high aspect ratio and deep depth. Therefore, depth cavities are easily formed by using the stopper of the embodiments of the present disclosure. The depth cavities of the MEMS devices prevent the sinking MEMS structures with large dimensions from touching the bottom of the cavity. Furthermore, the process of forming the cavities according to the embodiments of the present disclosure is also helpful in preventing the scratches on the supporting substrates which are caused by the conventional backside etching for forming cavity. Therefore, the production yield of the MEMS devices of the present disclosure is enhanced.

Moreover, according to some embodiments of the present disclosure, the supporting substrates of the MEMS devices are fabricated without using an SOI wafer. Therefore, the fabrication of the MEMS devices of the present disclosure is less time-consuming and less cost than the conventional MEMS devices fabricated by using an SOI wafer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A micro-electro-mechanical system (MEMS) device, comprising:
    a supporting substrate;
    a cavity disposed in the supporting substrate;
    a stopper disposed between the supporting substrate and the cavity, and an inner sidewall of the stopper being in contact with the cavity, wherein the stopper comprises:
        a filling material surrounding a periphery of the cavity; and
        a liner wrapping around the filling material; and
    a MEMS structure disposed over the cavity and attached on the stopper and the supporting substrate,
    wherein the liner extends from a first region at a bottom of the filling material to a second region between a sidewall of the filling material and the supporting substrate and to a third region between another sidewall of the filling material and the cavity.

2. The MEMS device of claim 1, wherein the supporting substrate comprises a core substrate, a bottom stopper on the core substrate, and a semiconductor layer on the bottom stopper, and the stopper is disposed along an inner sidewall of the semiconductor layer.

3. The MEMS device of claim 2, wherein the bottom stopper is disposed under the stopper and in contact with the stopper and the cavity.

4. The MEMS device of claim 2, wherein the semiconductor layer comprises a polysilicon layer wrapping around the core substrate and the bottom stopper.

5. The MEMS device of claim 2, wherein the semiconductor layer comprises an amorphous silicon layer or a single-crystalline silicon layer.

6. The MEMS device of claim 1, wherein the liner comprises a silicon oxide layer, the filling material comprises polysilicon or a dielectric material, and a portion of the filling material includes voids.

7. The MEMS device of claim 1, wherein the depth of the cavity is the same as the height of the stopper.

8. The MEMS device of claim 1, wherein the stopper has an aspect ratio between 10 and 20, and the depth of the cavity is between 20 μm and 300 μm.

9. The MEMS device of claim 1, wherein the MEMS structure includes a through hole in contact with the cavity.

* * * * *